United States Patent [19]

Takeuchi et al.

[11] Patent Number: 4,837,662

[45] Date of Patent: Jun. 6, 1989

[54] GAS INSULATED SWITCHGEAR

[75] Inventors: Hiroshi Takeuchi; Kiyokazu Torimi; Keizo Takatsuka, all of Amagasaki, Japan

[73] Assignee: Mitsubishi Denki Kabushiki Kaisha, Japan

[21] Appl. No.: 102,338

[22] Filed: Sep. 29, 1987

[30] Foreign Application Priority Data

Oct. 7, 1986 [JP] Japan .............................. 61-153156[U]

[51] Int. Cl.$^4$ ............................................... H02B 1/04
[52] U.S. Cl. .................................... 361/335; 361/341; 361/355; 361/361
[58] Field of Search ................................ 361/331–335, 361/341, 355, 361, 378

[56] References Cited

U.S. PATENT DOCUMENTS

| | | | |
|---|---|---|---|
| 4,500,762 | 2/1985 | Yoshizumi | 200/144 AP |
| 4,503,481 | 3/1985 | Fujiya et al. | 361/341 |
| 4,652,708 | 3/1987 | Okuno et al. | 200/146 R |
| 4,687,890 | 8/1987 | Yamamoto | 200/148 |
| 4,688,136 | 8/1987 | Yamauchi | 361/120 |

*Primary Examiner*—A. D. Pellinen
*Assistant Examiner*—Gregory D. Thompson
*Attorney, Agent, or Firm*—Leydig, Voit & Mayer

[57] ABSTRACT

A gas insulated switchgear in which the fastening portion at the lead-in terminals connecting the first cable head vessel and the second cable head vessel is at a level lower than the level of the fastening portion at the lead-in terminals connecting the interrupter vessel and the first cable head vessel. The conductors extend from the interrupter in the interrupter vessel to the first cable heads through the lead-in terminals at one side of the first cable head vessel, and from the first cable heads to the second cable heads through the opposite side of the first cable head vessel. Therefore, the height dimension of the second cable head vessel can be decreased to provide a gas insulated switchgear which is economically superior and efficiently utilizes the total space.

6 Claims, 4 Drawing Sheets

GAS INSULATED SWITCHGEAR

BACKGROUND OF THE INVENTION

This invention relates to a gas insulated switchgear.

FIG. 1 is a side view of one example of a conventional three-phase-in-one type gas insulated switchgear disclosed in Japanese Patent Laid-Open No. 60-213213 for example, and FIG. 2 is a plan view of FIG. 1. FIG. 3 is a single line connection diagram of the switchgear shown in FIGS. 1 and 2.

As shown, the conventional switchgear establishes an electrical connection from the main bus bars 2 through a bus bar disconnector 3, an interrupter vessel 1 (on the bus bar side), and a line disconnector 4 (on the line side), to cable heads 5 and 6 respectively disposed in two separate cable head vessels. The first cable head vessel includes first and second lead-in terminal portions 20 and 21 and the second cable head vessel includes a first lead-in terminal portion 22. On the bus bar side of the interrupter vessel 1, which houses interrupters operable to interrupt currents flowing therethrough, there is provided with a first lead-in terminal portion connecting the vessel with the bus bar disconnector 3. On the line side of the interrupter vessel 1 a second lead-in terminal portion 19 is connected to vessel 9 of the first cable head vessel through the first lead-in terminal portion 20 of the first cable head vessel and bellows 13. Within the first cable head vessel, the line disconnectors 4 and the first cable heads 5 are enclosed.

Further, a second lead-in terminal portion 21 of the first cable head vessel is connected to the second cable head vessel 10 through its first lead-in terminal portion 22.

The reference numeral 7 indicates conductors connecting the components, 8 insulating spacers, 11 first cables extending from the first cable heads 5, 12 second cables extending from the second cable heads 6, 14 an operating mechanism for operating the interrupter within the interrupter vessel 1, 15 and 16 first and second cable current transformers, and 17 grounded switches.

Since the conventional three-phase-in-one type gas insulated switchgear is constructed as above described, the conductors 7 for connecting the first lead-in terminal portion 22 of the second cable head vessel 10 to the second cable heads 6 must be significantly long, and the second cable head vessel 10 must be significantly high, resulting in disadvantages in the space usage and economy.

SUMMARY OF THE INVENTION

This invention has the objectives of overcoming the above problems and has for its main object the provision of a three-phase-in-one type gas insulated switchgear superior in economy and space usage efficiency without increasing the size of the component vessels.

In the three-phase-in-one type gas insulated switchgear according to the present invention, the level of the fastening portions of the lead-in terminal portions connecting the first cable head vessel and the second cable head vessel is lowered close to the level of the top portions of both the cable heads, thereby enabling the height of the second cable head vessel to be smaller than that of the first cable head vessel.

According to the present invention, since the height dimension of the second cable head vessel can be reduced as compared to that of the conventional design, the switchgear can be made small-sized, light-weight and economical, and the space can be efficiently utilized.

BRIEF DESCRIPTION OF THE DRAWINGS

The present invention will become more readily apparent from the following detailed description of the preferred embodiment of the invention taken in conjunction with the accompanying drawings, in which.

Throughout the figures, the same reference numerals designate identical or corresponding components.

DESCRIPTION OF THE PREFERRED EMBODIMENT

Figure 3:
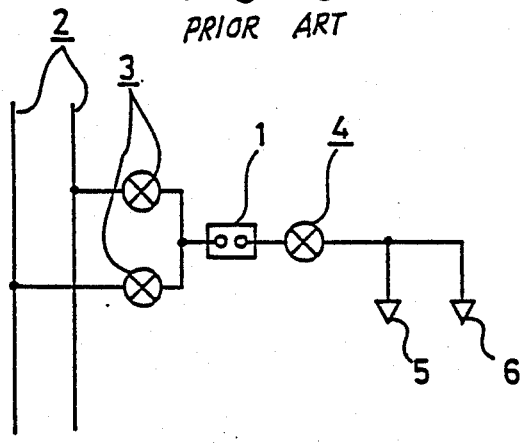
FIG. 3 is a single line connection diagram of the switchgear shown in FIGS. 1 and 2.
Figure 4:
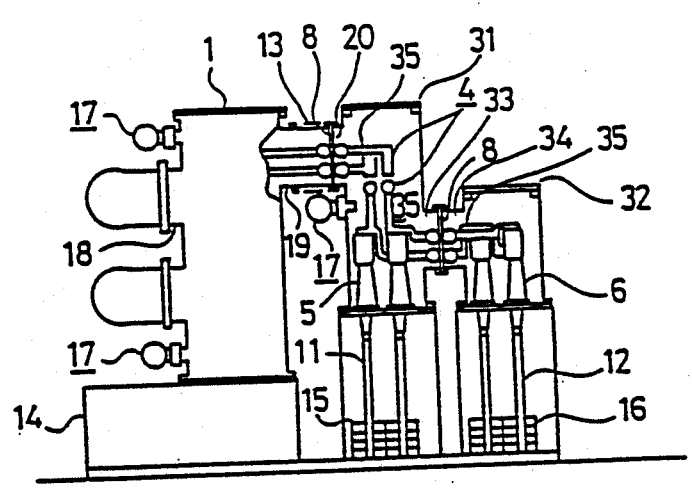
FIG. 4 is a side view of a three-phase-in-one type gas insulated switchgear of one embodiment of the present invention.
Figure 5:
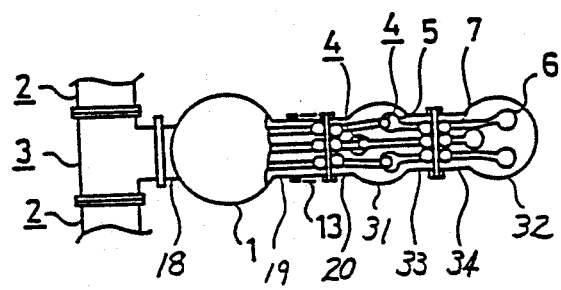
FIG. 5 is a plan view of the switchgear shown in FIG. 4.

FIG. 4 is a side view of an embodiment of the gas insulated switchgear of the present invention, and FIG. 5 is a plan view of the switchgear shown in FIG. 4. The single line connection diagram for this embodiment is identical to that shown in FIG. 3 in connection with the conventional switchgear.

In these figures, within the first cable head vessel 31, the line disconnector 4 is contained in the upper space thereof together with the second cable heads 5, and the first lead-in terminal portion 33 of the first cable head vessel 31 and the first lead-in terminal portion 34 of the second cable head vessel 32 are disposed and connected to each other at the level close to the top portion of the second cable heads 6. This connection portion is passed through by conductors 35 electrically connecting the first and the second cable heads 5 and 6 which extend substantially horizontally because the cable heads 5 and 6 are at substantially the same level. Also, the conductors 35 are disposed at substantially equal level to that of a metallic shield mounted to the tips of the cable heads 5 and 6 for surrounding the lead-in portions of the cable conductors of each of the cable heads 5 and 6.

Figure 1:
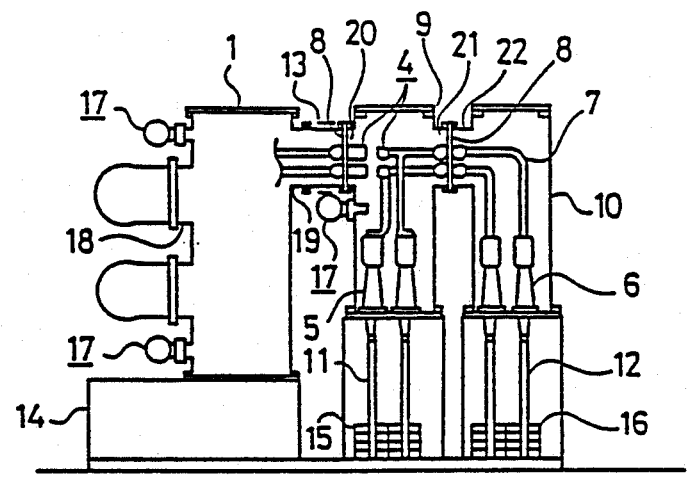
FIG. 1 is a side view of a conventional three-phase-in-one type gas insulated switchgear.
Figure 2:
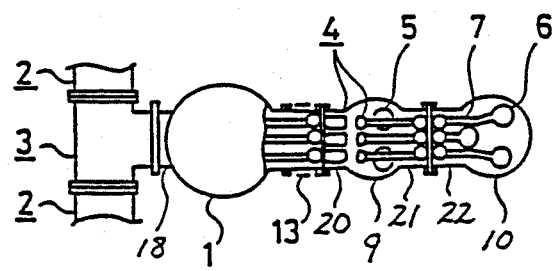
FIG. 2 is a plan view of the switchgear shown in FIG. 1.

The components designated by reference numerals other than the above reference numerals are identical or similar to those designated by the same reference numerals in FIGS. 1–3.

Generally, the cable heads must be positioned at a certain level from ground for the installation of current transformers 15 and 16 and wiring of the cables 11 and 12.

On the other hand, since the switchgear is limited in its height dimension for economical and shipping reasons, the height dimension of the cable head vessels are also constrained to be within a certain limit.

This invention relates to a switchgear of two line cable type in which, while two cable head vessels have been made equal in the conventional design, about an upper half of the height of the second cable head vessel 32 is made removable by connecting the first cable head vessel 31 and the second cable head vessel 32 by means of the respective second and first lead-in terminal portions 33 and 34 positioned at the level close to the top portion of the cable heads 5 and 6 which are made lower than those of the conventional design.

In the above embodiment, the grounded switches may be disposed within the first cable head vessel and its stationary side electrode may be disposed in the vicinity of at least one of electrodes of the disconnecting unit of the line disconnector 4.

Also, while the line disconnector 4 is inserted into the conductor connecting the interrupter 1 to the first and the second cable heads 5 and 6 within the first cable head vessel 31 in the above embodiment, this line disconnector 4 may be eliminated so that these compounds are always electrically connected if desired.

Figure 6:
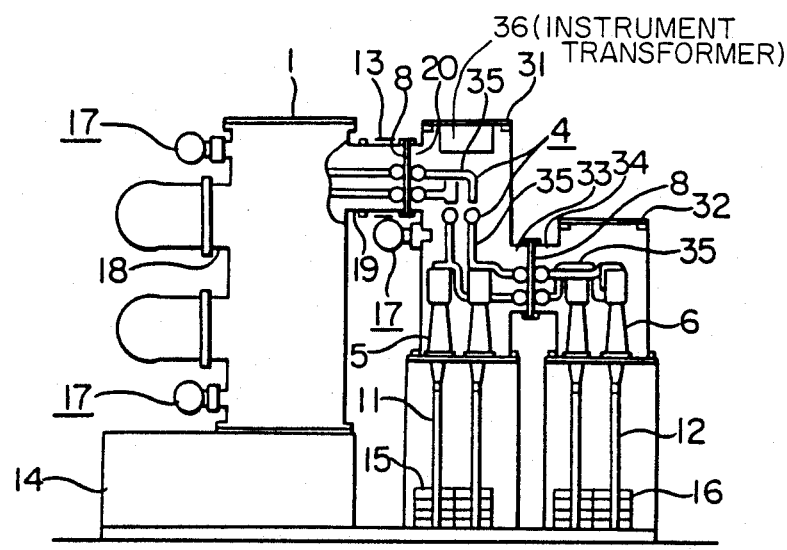
FIGS. 6 and 7 are side views of the switchgear illustrating the locations of an instrument transformer.
Figure 7:
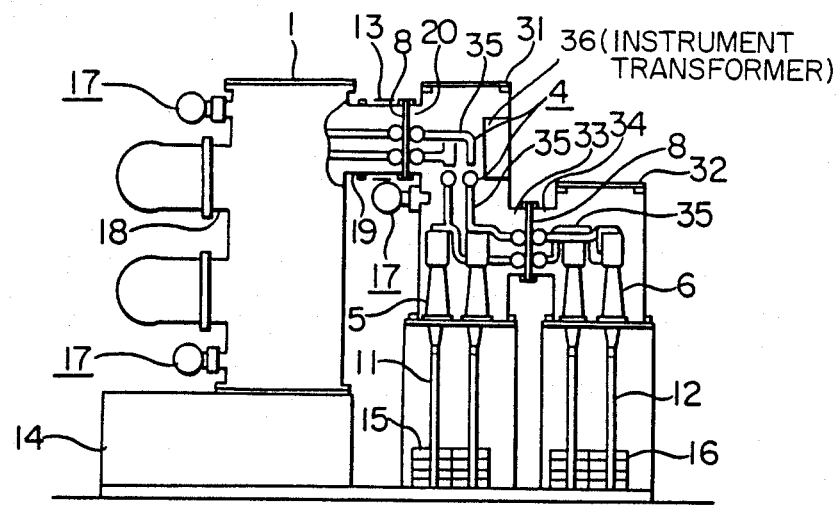

Further, although not provided in the above embodiment, an instrument transformer 36 may be provided in the uppermost space of the interior of the first cable head vessel 31 (FIG. 6) and, alternatively, the instrument transformer 36 may be disposed in a lead-in terminal portion provided to extend in the radial direction to oppose the second lead-in terminal 20 of the first cable head vessel 31 (FIG. 7).

As has been described, according to the present invention, the level of the fastening portions of the lead-in terminal portions connecting the first cable head vessel and the second cable head vessel is arranged to be lower than the level of the fastening portions of the lead-in terminal portions connecting the interrupter vessel and the first cable head vessel, and the conductors connecting the interrupter to the cable heads are introduced into the lead-in terminal portion of the lead-in terminal on the side of the second cable head vessel of the first cable heads and the first cable head vessel. Therefore, the height dimension of the second cable head vessel can be decreased, so that a gas insulated switchgear economically superior and which can efficiently utilize the space is obtained.

What is claimed is:

1. A gas insulated switchgear comprising:
   an upstanding interrupter vessel having a base;
   an interrupter in said interrupter vessel which is operable to interrupt current flowing therethrough, said interrupter having interrupter lead-in terminals;
   a first cable head vessel including upstanding first cable heads located at a level above said base, said first cable heads having lead-in terminals at opposite first and second sides of said first cable head vessel;
   a second cable head vessel including upstanding second cable heads located at a level above said base substantially the same as the level of said first cable heads, said second cable heads having lead-in terminals at one side of said second cable head vessel;
   fastening portions fastening, respectively,
   said interrupter vessel and said first cable head vessel, and
   said first and second cable head vessels;
   said fastening portion fastening said first and second cable head vessels being at a level above said base lower than said fastening portion fastening said interrupter vessel and said first cable head vessel; and
   conductors connecting said interrupter to said first cable heads through the interrupter lead-in terminals and the lead-in terminals at the first side of said first cable head vessel, and connecting said first cable heads to said second cable heads through the lead-in terminals at the second side of said first cable head vessel and the lead-in terminals at the one side of said second cable head vessel;
   each of said vessels being filled with an electrically insulating gas.

2. A gas insulated switchgear as claimed in claim 1 further comprising a line disconnector in said conductors connecting said interrupter to said first cable heads and disposed in an upper space within said first cable head vessel.

3. A gas insulated switchgear as claimed in claim 2 further comprising a ground switch partly disposed within said first cable head vessel.

4. A gas insulated switchgear as claimed in claim 1 wherein said conductors connecting said first cable heads to said second cable heads are horizontally disposed at a level substantially equal to a level of metallic shields on top of said first and second cable heads.

5. A gas insulated switchgear as claimed in claim 1 further comprising an instrument transformer disposed within an uppermost space of said first cable head vessel.

6. A gas insulated switchgear as claimed in claim 1 further comprising an instrument transformer disposed within said first cable head vessel at a lcoation which is substantially higher above said base than said lead-in terminals at the one side of said second cable head vessel and which is opposite said lead-in terminals at the first side of said first cable head vessel.

* * * * *